UNITED STATES PATENT OFFICE.

EDWARD GOODRICH ACHESON, OF NIAGARA FALLS, ONTARIO, CANADA.

METHOD OF TREATING AMORPHOUS BODIES AND PRODUCT THEREOF.

1,082,386.   Specification of Letters Patent.   Patented Dec. 23, 1913.

No Drawing.   Application filed May 6, 1910. Serial No. 559,830.

*To all whom it may concern:*

Be it known that I, EDWARD GOODRICH ACHESON, a citizen of the United States, residing at Niagara Falls, Ontario, Canada, have invented certain new and useful Improvements in Methods of Treating Amorphous Bodies and Product Thereof, of which the following is a specification.

In my prior patents relating to the deflocculation of insoluble amorphous bodies by means of re-agents having effects like those due to tannin, cutch, etc., I have pointed out that such re-agents are capable, when used in relatively small proportions and after a more or less prolonged action, of bringing about such subdivision of these bodies that they are capable of remaining indefinitely in suspension in water and other liquids, and of passing, when so suspended, through the finest filter paper. In this state, the bodies are said to be deflocculated. I have also pointed out that the maximum yield of suspensible or deflocculated material is secured when the presence of any substantial excess of the deflocculating agent is avoided.

I have found that when a considerable proportion or excess of the re-agent, as, for example, an aqueous solution of cutch or tannin, with or without the addition of ammonia, is used, there is at first a marked deflocculating action, the material passing into the suspensible condition; after some time, however, the liquid becomes clear and may be decanted or filtered from any solid residue.

Referring specifically to the treatment of graphite I have observed that when a weighed quantity of finely pulverized graphite is subjected to the action of an aqueous solution of cutch, the latter in such excess of the proportion suitable for deflocculation, with production of a suspensible body, that a clear liquid is obtained as above described, there is a disappearance or apparent loss or solution of a portion of the graphite which may attain 15% or more of the total weight, at times very greatly exceeding this proportion. Under proper conditions substantially all of the material may be dissolved.

On evaporating the clear filtrate from the graphite treated as above, there was observed an abundant separation of a black pulverulent material, which I have collected and dried. This material is freely soluble in water, particularly when heated. Its precise chemical nature is at present unknown.

Without thereby limiting the invention, it may be suggested as a possible explanation of the observed phenomena, that the subdivision of the particles has progressed beyond the limits of visibility and to such an extent that the liquid appears clear to the eye. The disappearance of graphite and other amorphous bodies, under the conditions above described, is herein referred to as a solution of these bodies, although it is not intended to indicate thereby that such solution necessarily involves the entrance of the dissolved substance into chemical combination with the solvent. It is regarded as probable, however, that it does so enter into combination, at least, in some instances.

The solution may be aided by application of heat and stirring, or by pugging or masticating the mass in a paste form, followed by suitable dilution with water. Lampblack similarly treated appears to dissolve in the re-agent with considerable readiness, and I now believe the process to be applicable broadly to those amorphous and insoluble materials, which, as pointed out in my prior patents, have been found capable of deflocculation and suspension.

I claim:

1. The method of treating amorphous bodies of the character described, which consists in re-acting thereon with a deflocculating agent containing tannin or equivalent substance in excess of the proportion required to produce deflocculation, whereby a part or all of the material is dissolved.

2. As a new composition of matter, a solution of an amorphous body of the character described in a deflocculating medium containing tannin or equivalent substance.

3. As a new composition of matter, a solution of carbon or graphite in a deflocculating medium containing tannin or equivalent substance.

4. The method, which consists in reacting upon carbon or graphite with a deflocculating agent containing tannin or equivalent substance in excess of the proportion required to produce deflocculation.

In testimony whereof, I affix my signature in presence of two witnesses.

EDWARD GOODRICH ACHESON.

Witnesses:
 EDW. G. ACHESON, Jr.,
 FRANK N. COE.